United States Patent
Liang et al.

(10) Patent No.: US 9,675,959 B2
(45) Date of Patent: Jun. 13, 2017

(54) POROUS SILICON OXYNITRIDE MATERIALS FOR CHROMATOGRAPHIC SEPARATION AND METHOD OF THEIR PREPARATION

(71) Applicants: Xinmiao Liang, Dalian (CN); Huihui Wan, Dalian (CN); Xingya Xue, Dalian (CN)

(72) Inventors: Xinmiao Liang, Dalian (CN); Huihui Wan, Dalian (CN); Xingya Xue, Dalian (CN)

(73) Assignee: DALIAN INSTITUTE OF CHEMICAL PHYSICS, CHINESE ACADEMY OF SCIENCES, Dalian, Liaoning (CN)

( * ) Notice: Subject to any disclaimer, the term of this patent is extended or adjusted under 35 U.S.C. 154(b) by 449 days.

(21) Appl. No.: 13/872,081

(22) Filed: Apr. 27, 2013

(65) Prior Publication Data

US 2013/0233801 A1    Sep. 12, 2013

Related U.S. Application Data

(63) Continuation-in-part of application No. PCT/CN2011/080687, filed on Oct. 12, 2011.

(30) Foreign Application Priority Data

Oct. 27, 2010   (CN) .......................... 2010 1 0521325
Sep. 23, 2011   (CN) .......................... 2011 1 0286467

(51) Int. Cl.
  *B01D 15/26*    (2006.01)
  *B01J 20/28*    (2006.01)
  (Continued)

(52) U.S. Cl.
  CPC ......... *B01J 20/288* (2013.01); *B01J 20/3204* (2013.01); *B01J 20/3246* (2013.01);
  (Continued)

(58) Field of Classification Search
  CPC .......... B01D 15/22; B01D 15/26; B01J 20/10; B01J 20/103; B01J 20/28002;
  (Continued)

(56) References Cited

U.S. PATENT DOCUMENTS 6,074,555 A * 6/2000 Boos .................... B01D 15/325
                                                        210/198.2
6,096,656 A     8/2000 Matzke et al.
2011/0049056 A1* 3/2011 Wyndham .............. B01D 15/08
                                                        210/656

FOREIGN PATENT DOCUMENTS

CN    1056908 A    12/1991
CN    1666820 A     9/2005
(Continued)

OTHER PUBLICATIONS

Xia et al. Highly ordered mesoporous silicon oxynitride materials as base catalysts. Angew. Chem. 2003, 115, 2743-2748.*

*Primary Examiner* — Katherine Zalasky
(74) *Attorney, Agent, or Firm* — Novick, Kim & Lee, PLLC; Allen Xue

(57) ABSTRACT

Novel material for chromatographic separations, processes for its preparation, and separation devices containing the chromatographic material. In particular, the novel materials are porous silicon oxynitride materials, which desirably can be surface modified and have enhanced stability at high pH. The novel porous silicon oxynitride material may offer efficient chromatographic separations, and hold great promise as packing material for chromatographic separations.

14 Claims, 5 Drawing Sheets

Chemical shift / ppm

(51) Int. Cl.
*B01J 20/283* (2006.01)
*B01J 20/32* (2006.01)
*B01J 20/288* (2006.01)
*C01B 21/082* (2006.01)
*B01D 15/22* (2006.01)
*B01J 20/282* (2006.01)
*B01J 20/281* (2006.01)

(52) U.S. Cl.
CPC ....... B01J 20/3248 (2013.01); C01B 21/0823 (2013.01); *B01D 15/26* (2013.01); *B01J 20/281* (2013.01); *B01J 20/282* (2013.01); *B01J 20/283* (2013.01); *B01J 20/28057* (2013.01); *B01J 20/28069* (2013.01); *B01J 20/28083* (2013.01); *C01P 2002/86* (2013.01); *C01P 2002/87* (2013.01); *C01P 2004/61* (2013.01); *C01P 2004/62* (2013.01); *C01P 2006/12* (2013.01); *C01P 2006/14* (2013.01); *C01P 2006/16* (2013.01); *Y10T 428/2982* (2015.01)

(58) Field of Classification Search
CPC ............ B01J 20/28004; B01J 20/28057; B01J 20/28059; B01J 20/28061; B01J 20/28064; B01J 20/28071; B01J 20/28073; B01J 20/28076; B01J 20/2802; B01J 20/28083; B01J 20/281; B01J 20/282; B01J 20/283

See application file for complete search history.

(56) References Cited

FOREIGN PATENT DOCUMENTS

| CN | 1877879 A | 12/2006 |
|---|---|---|
| WO | WO 2009/126207 | * 10/2009 |

* cited by examiner

POROUS SILICON OXYNITRIDE MATERIALS FOR CHROMATOGRAPHIC SEPARATION AND METHOD OF THEIR PREPARATION

BACKGROUND

High-performance liquid chromatography (HPLC) is an efficient, innovative, fast, and widely used analytical technique. HPLC has already become one of the most commonly used analytical tools in chemistry, food hygiene, drug testing, environmental monitoring, and many other areas. Packing material surface property will influence seriously the retention process of the analytes in LC columns. The chemistry and structure of the packing material control the specific polar and non-specific solvophobic interactions between the analyte and the stationary phase, which decide on the separation mode in HPLC.

Packing materials for HPLC are generally classified into three types: organic polymeric materials, e.g., polydivinylbenzene, inorganic materials typified by silica, and hybrid materials. Many organic materials are chemically stable against strongly alkaline and strongly acidic mobile phases, allowing flexibility in the choice of mobile phase pH. However, organic chromatographic materials generally result in columns with low efficiency, leading to inadequate separation performance, particularly with low molecular-weight analytes. Furthermore, many organic chromatographic materials shrink and swell when the composition of the mobile phase is changed. In addition, most organic chromatographic materials do not have the mechanical strength of typical chromatographic silicas.

Among the inorganic materials, which include silica, hydroxyapatite, graphite, and metal oxides, etc., silica is almost an ideal support in view of its favorable characteristics, for example good mechanical strength, high chemical and thermal stability, controllable pore structure and surface area, surface rich in silanol groups, etc. Silica-based stationary phase can offer high chromatographic efficiency and reproducible separations over a wide range of operating conditions. In particular, their extremely rich silanol surface chemistry endows silica packings flexible chemical surface tailorability, i.e., various kinds of organic groups such as octadeyl, octyl, phenyl, amino, cyano, etc. could be tightly grafted onto the silica surface, and have accordingly been applied in different separation modes. However, during a typical derivatization process such as reaction with octadecyldimethylchlorosilane, at least 50% of the surface silanol groups remain unreacted. The surface silanol groups of silica can be attacked under alkaline conditions, leading to the dissolution of silica and column degradation. In most cases, silica-based packings, including bare silica, and bonded phase, have not been recommended to be used above pH 8. Additionally, these residual silanol groups interact with basic and acidic analytes via ion exchange, hydrogen bonding and dipole/dipole mechanisms. The residual silanol groups create problems including increased retention, excessive peak tailing and irreversible adsorption of some analytes.

To overcome the problems of residual silanol group activity and high pH stability of silica-based stationary phases, many methods have been tried including post-synthesis grafting approaches and direct synthesis approaches. Post-synthesis modification of silica is mainly focused silane coupling agents to react with more Si—OH groups on the surface and shield residual surface silanol. For example, end-capped bonded-phase, bidentate silane, and horizontal polymerization technology have been successfully taken to extend the high pH stability of silica-based phases. Porous hybrid silica materials with organic units distributed homogeneously in the framework as direct components exhibit improved stability in high-pH mobile phases. However, the introduction of organic units in the surface and framework of hybrid silica restricts the use of such hybrid silica materials as hydrophilic stationary phase. Thus, the quest to develop stationary phase material with high-pH stability and flexible chemical surface tailorability is of extreme significance.

Silicon oxynitride material has attracted a great deal of attention as nitrogen-containing solid basic material. By treating porous silica precursor under ammonia condition at high temperature, nitrogen or NHx species such as NH2 and bridging NH groups can be incorporated into the framework of silica through displacement of silanol groups and bridging oxygen without compromising the characteristics of silica (morphology, high surface area, and narrow pore size distribution). With polar surface NHx groups and a porous structure, this porous silicon oxynitride material is stable to alkaline mobile phases. The reactivity of surface Si—NH2 and Si—NH—Si groups of porous silicon oxynitride material allows tailoring of the surface through modification using different functionalized reagents, and opens up a broad applicability in different separation modes.

SUMMARY OF THE INVENTION

The present invention relates to porous silicon oxynitride material and its use in chromatographic separations, processes for its preparation, and separation devices containing the chromatographic material. Thus, one aspect of the invention is a porous silicon oxynitride material, exhibits substantial improvement of chemical stability under high-pH mobile phase condition.

Another aspect of the invention is a porous silicon oxynitride material, comprising porous silicon oxynitride particles having a chromatographically-enhancing pore geometry. The particles are surface modified with a surface modifier having the formula $Z_a(R')_b Si\text{—}R$, where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R is a functionalizing group.

Another aspect of the invention is a porous silicon oxynitride material, comprising porous silicon oxynitride particles having a chromatographically-enhancing pore geometry. The particles are surface modified with a surface modifier having the formula R"Z', wherein Z' is selected from the group consisting of Cl, Br, I, acyl chloride, aldehyde, and epoxy group, and functionalizing group R" is a functionalizing group similar to R.

An additional aspect of the invention is a method of preparation of porous silicon oxynitride particles having a chromatographically-enhancing pore geometry, comprising the steps of forming porous silicon oxynitride particles.

In another aspect of the invention, the invention is a method of preparation of porous silicon oxynitride particles having a chromatographically-enhancing pore geometry, comprising the steps of
 a) forming porous silicon oxynitride particles, and
 b) surface modifying the porous particles
wherein the surface modification step includes surface modifying the porous particles with a surface modifier having the formula $Z_a(R')_b Si\text{—}R$, where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R is a functionalizing group.

Additional aspect of the invention, the invention is a method of preparation of porous silicon oxynitride particles having a chromatographically-enhancing pore geometry, comprising the steps of a) forming porous silicon oxynitride particles, and b) surface modifying the porous particles wherein said particles have been surface modified with a surface modifier having the formula R"Z', wherein Z' is selected from the group consisting of Cl, Br, I, acyl chloride, aldehyde, and epoxy group, and R" is a functionalizing group similar to R.

Yet another aspect of the invention is a separation device having a stationary phase comprising porous silicon oxynitride particles having a chromatographically-enhancing pore geometry.

Another aspect of the invention is a separation device having a stationary phase comprising porous silicon oxynitride particles having a chromatographically-enhancing pore geometry, wherein the particles have been surface modified with a surface modifier having the formula $Z_a(R')_b$Si—R, where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R is a functionalizing group.

Another aspect of the invention is a separation device having a stationary phase comprising porous silicon oxynitride particles having a chromatographically-enhancing pore geometry, wherein said particles have been surface modified with a surface modifier having the formula R"Z', wherein Z' is selected from the group consisting of Cl, Br, I, acyl chloride, aldehyde, and epoxy group, and R" is a functionalizing group similar to R.

In yet another aspect, the invention is a chromatographic column having improved lifetime, comprising a) a column having a cylindrical interior for accepting a packing material, and b) a packed chromatographic bed comprising porous silicon oxynitride particles having a chromatographically-enhancing pore geometry of the formula $SiO_xN_y$, wherein 0≤x<2, 0<y≤4/3, and 2x+3y=4, said porous silicon oxynitride chromatographic matrix having a chromatographically-enhancing pore geometry, mean particle size of about 0.5 to 100 μm, specific surface area of about 30 to 800 $m^2$/g, specific pore volumes of about 0.15 to 1.5 $cm^3$/g and average pore diameters of about 30 to 500 Å, and said porous particles of silicon oxynitride have been surface modified.

Another aspect, the invention is a chromatographic column having improved lifetime, comprising a) a column having a cylindrical interior for accepting a packing material, and b) a packed chromatographic bed comprising porous silicon oxynitride particles having a chromatographically-enhancing pore geometry that have been surface modified with a surface modifier having the formula $Z_a(R')_b$Si—R, where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R is a functionalizing group.

Another aspect, the invention is a chromatographic column having improved lifetime, comprising a) a column having a cylindrical interior for accepting a packing material, and b) a packed chromatographic bed comprising porous silicon oxynitride particles having the formula R"Z', wherein Z' is selected from the group consisting of Cl, Br, I, acyl chloride, aldehyde, and epoxy group, and R" is a functionalizing group similar to R.

Another aspect of the invention is a method of preparation of porous particles of silicon oxynitride having a chromatographically-enhancing pore geometry, comprising the step of heating porous silica in the presence of $NH_3$ atmosphere to produce silicon oxynitride, thereby producing porous particles of silicon oxynitride having a chromatographically-enhancing pore geometry.

DETAILED DESCRIPTION OF THE INVENTION

Figure 1:
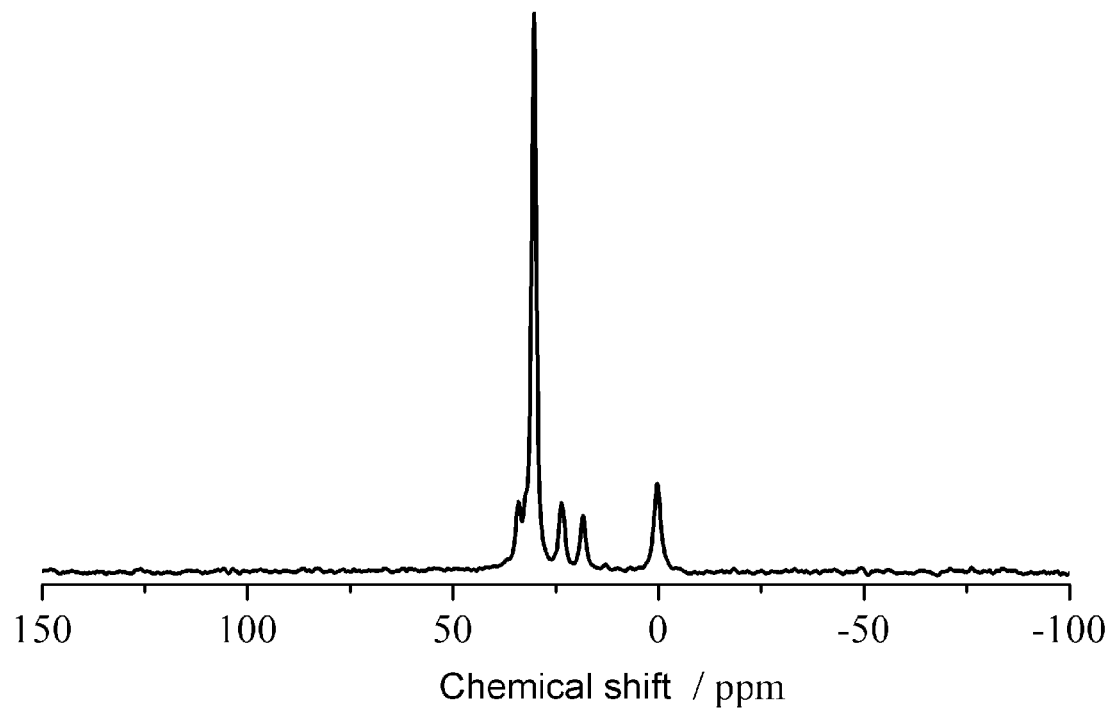
FIG. 1 is a $^{13}C$ CPMAS NMR spectrum of octadecyl bonded silicon oxynitride material.

The present invention will be more fully illustrated by reference to the definitions set forth below.

Chromatographically-enhancing pore geometry is found in silicon oxynitride particles. Silicon oxynitride materials give chromatographic enhancements including high separation efficiency, good mass transfer properties (as evidenced by, e.g., reduced band spreading and good peak shape), and high-pH stability. Silicon oxynitride particles have a chromatographically-enhancing pore geometry, an interior area and an exterior surface.

Porous silicon oxynitride particles are prepared by heat treatment of silica particles in a flow of ammonia gas. The process allow much better control of the particle sphericity, morphology, pore volume and pore sizes, and thus provide the chromatographically-enhancing pore geometry. After nitridation the silanol groups on the surface of porous silica are replaced by Si—NH$_2$ and Si—NH—Si groups, and therefore the surface concentration of the remaining silanol groups in the silicon oxynitride is smaller. The resulting material, used as a stationary phase for LC, shows excellent peak shape for basic analytes, and better stability to alkaline mobile phases than silica-based packing materials.

"Silicon oxynitride", includes nitrogen or NH$_x$ species in both the internal or "skeletal" inorganic structure. By treating porous silica precursor under ammonia condition at high temperature, nitrogen or NHx species such as NH$_2$ and bridging NH groups can be incorporated into the framework of silica through displacement of silanol groups and bridging oxygen without compromising the structure characteristics of silica. Silicon oxynitride refers to a material having a composition represented by SiO$_x$N$_y$, wherein $0 \leq x < 2$, $0 < y \leq 4/3$, and $2x+3y=4$.

The term "functionalizing group" includes organic functional groups which impart a certain chromatographic functionality to a chromatographic stationary phase, including, e.g., octadecyl (C$_{18}$) or phenyl. Such functionalizing groups are present in, e.g., surface modifiers such as disclosed herein which are attached to the base material, e.g., via derivatization or coating and later crosslinking, imparting the chemical character of the surface modifier to the base material. In an embodiment, such surface modifiers have the formula the formula Z$_a$(R')$_b$Si—R, where Z=Cl, Br, I, C$_1$-C$_5$ alkoxy, dialkylamino, e.g., dimethylamino, or trifluoromethanesulfonate; a and b are each an integer from 0 to 3 provided that a+b=3; R' is a C$_1$-C$_6$ straight, cyclic or branched alkyl group, and R is a functionalizing group. R' may be, e.g., methyl, ethyl, propyl, isopropyl, butyl, t-butyl, sec-butyl, pentyl, isopentyl, hexyl or cyclohexyl; preferably, R' is methyl.

The porous silicon oxynitride particles possess both NH$_x$ groups and silanol groups which both may additionally be substituted or derivatized with a surface modifier. "Surface modifiers" include (typically) organic functional groups which impart a certain chromatographic functionality to a chromatographic stationary phase. Surface modifiers such as disclosed herein are attached to the base material, e.g., via derivatization or coating and later crosslinking, imparting the chemical character of the surface modifier to the base material. In one embodiment, the organic groups of the hybrid particle react to form an organic covalent bond with a surface modifier. The modifiers can form an organic covalent bond to the particle's organic group via a number of mechanisms well known in organic and polymer chemistry including but not limited to nucleophilic, electrophilic, cycloaddition, free-radical, carbene, nitrene, and carbocation reactions. Organic covalent bonds are defined to involve the formation of a covalent bond between the common elements of organic chemistry including but not limited to hydrogen, boron, carbon, nitrogen, oxygen, silicon, phosphorus, sulfur, and the halogens.

In another embodiment, both NH$_x$ groups and silanol groups are surface modified with compounds having the formula Z$_a$(R')$_b$Si—R, where Z=Cl, Br, I, C$_1$-C$_5$ alkoxy, dialkylamino, e.g., dimethylamino, or trifluoromethanesulfonate; a and b are each an integer from 0 to 3 provided that a+b=3; R' is a C$_1$-C$_6$ straight, cyclic or branched alkyl group, and R is a functionalizing group. R' may be, e.g., methyl, ethyl, propyl, isopropyl, butyl, t-butyl, sec-butyl, pentyl, isopentyl, hexyl or cyclohexyl; preferably, R' is methyl. In certain embodiments, the organic groups may be similarly functionalized.

The functionalizing group R may include alkyl, aryl, cyano, amino, diol, nitro, cation or anion exchange groups, or embedded polar functionalities, such as disclosed in U.S. Pat. No. 7,223,473, the text of which is incorporated herein by reference. Examples of suitable R functionalizing groups include C$_1$-C$_{30}$ alkyl, including C$_1$-C$_{20}$, such as octyl (C$_8$), octadecyl (C$_{18}$), and triacontyl (C$_{30}$); alkaryl, e.g., C$_1$-C$_4$-phenyl; cyanoalkyl groups, e.g., cyanopropyl; diol groups, e.g., propyldiol; amino groups, e.g., aminopropyl; and alkyl or aryl groups with embedded polar functionalities, e.g., carbamate functionalities, such as disclosed in U.S. Pat. No. 5,374,755, the text of which is incorporated herein by reference.

In another embodiment, the particles are surface modified by coating with a polymer. In certain embodiments, surface modification by coating with a polymer is used in conjunction with NH$_x$ group modification, silanol group modification, or both NH$_x$ group and silanol group modification.

In another embodiment, the particles are surface modified by modifier having the formula having the formula R"Z', wherein Z' is selected from the group consisting of Cl, Br, I, acyl chloride, aldehyde, and epoxy group, R" is a functionalizing group similar to R, e.g.

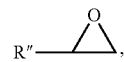

R"COCl, R"CHO, R"X.

The functionalizing group R" may include alkyl, aryl, cyano, amino, diol, nitro, cation or anion exchange groups, or embedded polar functionalities, such as disclosed in U.S. Pat. No. 7,223,473, the text of which is incorporated herein by reference. Examples of suitable R functionalizing groups include C$_1$-C$_{30}$ alkyl, including C$_1$-C$_{20}$, such as octyl (C$_8$), octadecyl (C$_{18}$), and triacontyl (C$_{30}$); alkaryl, e.g., C$_1$-C$_4$-phenyl; cyanoalkyl groups, e.g., cyanopropyl; diol groups, e.g., propyldiol; amino groups, e.g., aminopropyl; and alkyl or aryl groups with embedded polar functionalities, e.g., carbamate functionalities, such as disclosed in U.S. Pat. No. 5,374,755, the text of which is incorporated herein by reference.

The term "aliphatic group" includes organic compounds characterized by straight or branched chains, typically having between 1 and 22 carbon atoms. Aliphatic groups include alkyl groups, alkenyl groups and alkynyl groups. In complex structures, the chains can be branched or cross-linked. Alkyl groups include saturated hydrocarbons having one or more carbon atoms, including straight-chain alkyl groups and branched-chain alkyl groups. Such hydrocarbon moieties may be substituted on one or more carbons with, for example, a halogen, a hydroxyl, a thiol, an amino, an alkoxy, an alkylcarboxy, an alkylthio, or a nitro group. Unless the number of carbons is otherwise specified, "lower aliphatic" as used herein means an aliphatic group, as defined above (e.g., lower alkyl, lower alkenyl, lower alkynyl), but having from one to six carbon atoms. Representative of such lower aliphatic groups, e.g., lower alkyl groups, are methyl, ethyl, n-propyl, isopropyl, 2-chloropropyl, n-butyl, sec-butyl, 2-aminobutyl, isobutyl, tert-butyl, 3-thiopentyl, and the like. As used herein, the term "nitro" means —$NO_2$; the term "halogen" designates —F, —Cl, —Br or —I; the term "thiol" means SH; and the term "hydroxyl" means —OH. Thus, the term "alkylamino" as used herein means an alkyl group, as defined above, having an amino group attached thereto. Suitable alkylamino groups include groups having 1 to about 12 carbon atoms, preferably from 1 to about 6 carbon atoms. The term "alkylthio" refers to an alkyl group, as defined above, having a sulfhydryl group attached thereto. Suitable alkylthio groups include groups having 1 to about 12 carbon atoms, preferably from 1 to about 6 carbon atoms. The term "alkylcarboxyl" as used herein means an alkyl group, as defined above, having a carboxyl group attached thereto. The term "alkoxy" as used herein means an alkyl group, as defined above, having an oxygen atom attached thereto. Representative alkoxy groups include groups having 1 to about 12 carbon atoms, preferably 1 to about 6 carbon atoms, e.g., methoxy, ethoxy, propoxy, tert-butoxy and the like. The terms "alkenyl" and "alkynyl" refer to unsaturated aliphatic groups analogous to alkyls, but which contain at least one double or triple bond respectively. Suitable alkenyl and alkynyl groups include groups having 2 to about 12 carbon atoms, preferably from 1 to about 6 carbon atoms.

The term "alicyclic group" includes closed ring structures of three or more carbon atoms. Alicyclic groups include cycloparaffins or naphthenes which are saturated cyclic hydrocarbons, cycloolefins which are unsaturated with two or more double bonds, and cycloacetylenes which have a triple bond. They do not include aromatic groups. Examples of cycloparaffins include cyclopropane, cyclohexane, and cyclopentane. Examples of cycloolefins include cyclopentadiene and cyclooctatetraene. Alicyclic groups also include fused ring structures and substituted alicyclic groups such as alkyl substituted alicyclic groups. In the instance of the alicyclics such substituents can further comprise a lower alkyl, a lower alkenyl, a lower alkoxy, a lower alkylthio, a lower alkylamino, a lower alkylcarboxyl, a nitro, a hydroxyl, —$CF_3$, —CN, or the like.

The term "heterocyclic group" includes closed ring structures in which one or more of the atoms in the ring is an element other than carbon, for example, nitrogen, sulfur, or oxygen. Heterocyclic groups can be saturated or unsaturated and heterocyclic groups such as pyrrole and furan can have aromatic character. They include fused ring structures such as quinoline and isoquinoline. Other examples of heterocyclic groups include pyridine and purine. Heterocyclic groups can also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, —$CF_3$, —CN, or the like. Suitable heteroaromatic and heteroalicyclic groups generally will have 1 to 3 separate or fused rings with 3 to about 8 members per ring and one or more N, O or S atoms, e.g. coumarinyl, quinolinyl, pyridyl, pyrazinyl, pyrimidyl, furyl, pyrrolyl, thienyl, thiazolyl, oxazolyl, imidazolyl, indolyl, benzofuranyl, benzothiazolyl, tetrahydrofuranyl, tetrahydropyranyl, piperidinyl, morpholino and pyrrolidinyl.

The term "aromatic group" includes unsaturated cyclic hydrocarbons containing one or more rings. Aromatic groups include 5- and 6-membered single-ring groups which may include from zero to four heteroatoms, for example, benzene, pyrrole, furan, thiophene, imidazole, oxazole, thiazole, triazole, pyrazole, pyridine, pyrazine, pyridazine and pyrimidine, and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, —$CF_3$, —CN, or the like.

The term "alkyl" includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has 30 or fewer carbon atoms in its backbone, e.g., $C_1$-$C_{30}$ for straight chain or $C_3$-$C_{30}$ for branched chain. In certain embodiments, a straight chain or branched chain alkyl has 20 or fewer carbon atoms in its backbone, e.g., $C_1$-$C_{20}$ for straight chain or $C_3$-$C_{20}$ for branched chain, and more preferably 18 or fewer. Likewise, preferred cycloalkyls have from 4-10 carbon atoms in their ring structure, and more preferably have 4-7 carbon atoms in the ring structure. The term "lower alkyl" refers to alkyl groups having from 1 to 6 carbons in the chain, and to cycloalkyls having from 3 to 6 carbons in the ring structure.

Moreover, the term "alkyl" (including "lower alkyl") as used throughout the specification and claims includes both "unsubstituted alkyls" and "substituted alkyls", the latter of which refers to alkyl moieties having substituents replacing a hydrogen on one or more carbons of the hydrocarbon backbone. Such substituents can include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the substituents described above. An "aralkyl" moiety is an alkyl substituted with an aryl, e.g., having 1 to 3 separate or fused rings and from 6 to about 18 carbon ring atoms, e.g., phenylmethyl (benzyl).

The term "aryl" includes 5- and 6-membered single-ring aromatic groups that may include from zero to four heteroatoms, for example, unsubstituted or substituted benzene, pyrrole, furan, thiophene, imidazole, oxazole, thiazole, triazole, pyrazole, pyridine, pyrazine, pyridazine and pyrimidine, and the like. Aryl groups also include polycyclic fused aromatic groups such as naphthyl, quinolyl, indolyl, and the like. The aromatic ring can be substituted at one or more ring positions with such substituents, e.g., as described above for alkyl groups. Suitable aryl groups include unsubstituted and substituted phenyl groups. The term "aryloxy" as used herein means an aryl group, as defined above, having an oxygen atom attached thereto. The term "aralkoxy" as used herein means an aralkyl group, as defined above, having an oxygen atom attached thereto. Suitable aralkoxy groups have 1 to 3 separate or fused rings and from 6 to about 18 carbon ring atoms, e.g., O-benzyl.

The term "amino," as used herein, refers to an unsubstituted or substituted moiety of the formula —$NR_aR_b$, in which $R_a$ and $R_b$ are each independently hydrogen, alkyl, aryl, or heterocyclyl, or $R_a$ and $R_b$, taken together with the nitrogen atom to which they are attached, form a cyclic moiety having from 3 to 8 atoms in the ring. Thus, the term "amino" includes cyclic amino moieties such as piperidinyl or pyrrolidinyl groups, unless otherwise stated. An "amino-substituted amino group" refers to an amino group in which at least one of $R_a$ and $R_b$, is further substituted with an amino group.

The present porous silicon oxynitride particles having a chromatographically-enhancing pore geometry measured by $N_2$ sorption analysis generally have a mean particle size of about 0.5 to 100 μm, specific surface area of about 30 to 800 m$^2$/g, specific pore volumes of about 0.15 to 1.5 cm$^3$/g and average pore diameters of about 30 to 500 Å.

Porous silicon oxynitride particles having a chromatographically-enhancing pore geometry may be made as described below and in the specific instances illustrated in the Examples. Silica particles are placed in furnace. Prior to nitridation treatment, the silica particles are purged by $N_2$ to remove the air. Afterwards, the temperature of the furnace is increased and maintained at high temperature for a period under the $NH_3$ atmosphere with a flow rate. The furnace was then cooled down to room temperature and purged again with $N_2$ to remove the $NH_3$. The process can be repeated for many times to ensure homogenous nitridation. The above process allow much better control of the particle sphericity, morphology, pore volume, pore sizes, and the nitrogen content of the silicon oxynitride particles, and thus provide the chromatographically-enhancing pore geometry.

Where the morphology of precursor silica can be amorphous, or spherical. The spherical particle diameter size of the silica used for the nitridation can be varied, e.g. from 0.5 to 200 μm, or more preferably, about 1.7 to about 50 μm. The nitradation temperature can be varied, e.g., from about 600 to about 1250° C., or more preferably, about 900 to about 1100° C. The nitradation time can be varied, e.g., from about 0.1 to about 300 h, or more preferably, about 12 to about 120° C. The flow rate of $NH_3$ can be varied, e.g., from about 0.001 to about 50 L/min, or more preferably, about 100 to about 300 L/min. This allows the preparation of silicon oxynitride materials having waried nitrogen content, e.g., 0.1-40 wt. %.

In the second step, the surface of the silicon oxynitride contains surface Si—$NH_2$ and Si—NH—Si groups, and silanol groups, which can be derivatized by reacting with a reactive organosilane. The surface derivatization of the silicon oxynitride is conducted according to standard methods, for example by reaction with octadecyltrichlorosilane or octadecyldimethylchlorosilane in an organic solvent under reflux conditions. An organic solvent such as toluene is typically used for this reaction. An organic base such as pyridine or imidazole is added to the reaction mixture to catalyze the reaction. The product of this reaction is then washed with toluene, methanol, methanol/water, and methanol and dried at 60° C. to 100° C. The resultant silicon oxynitride can be further reacted with a short-chain silane such as trimethylchlorosilane to endcap the remaining silanol groups, by using a similar procedure described above.

Where the surface of the silicon oxynitride can also be derivatized by reacting with a reactive acyl chloride. The surface derivatization of the silicon oxynitride is conducted according to standard methods, for example by reaction with octadecanoyl chloride or octanoyl chloride in an organic solvent under reflux conditions. An organic solvent such as toluene is typically used for this reaction. An organic base such as pyridine or imidazole is added to the reaction mixture to catalyze the reaction. The product of this reaction is then washed with toluene, methanol, methanol/water, and methanol and dried at 60° C. to 100° C.

More generally, the surface of the silicon oxynitride particles may be surface modified with a surface modifier, e.g., $Z_a(R')_b$Si—R, where Z=Cl, Br, I, $C_1$-$C_5$ alkoxy, dialkylamino, e.g., dimethylamino, or trifluoromethanesulfonate; a and b are each an integer from 0 to 3 provided that a+b=3; R' is a $C_1$-$C_6$ straight, cyclic or branched alkyl group, and R is a functionalizing group. R' may be, e.g., methyl, ethyl, propyl, isopropyl, butyl, t-butyl, sec-butyl, pentyl, isopentyl, hexyl or cyclohexyl; preferably, R' is methyl.

The functionalizing group R may include alkyl, aryl, cyano, amino, diol, nitro, cation or anion exchange groups, or embedded polar functionalities. Examples of suitable R functionalizing groups include $C_1$-$C_{30}$ alkyl, including $C_1$-$C_{20}$, such as octyl ($C_8$), octadecyl ($C_{18}$), and triacontyl ($C_{30}$); alkaryl, e.g., $C_1$-$C_4$-phenyl; cyanoalkyl groups, e.g., cyanopropyl; diol groups, e.g., propyldiol; amino groups, e.g., aminopropyl; and alkyl or aryl groups with embedded polar functionalities, e.g., carbamate functionalities. In a preferred embodiment, the surface modifier may be an organotrihalosilane, such as octyltrichlorosilane or octadecyltrichlorosilane. In an additional preferred embodiment, the surface modifier may be a halopolyorganosilane, such as octyldimethylchlorosilane or octadecyldimethylchlorosilane. Advantageously, R is octyl or octadecyl. In a preferred embodiment, the surface modifier may be an acyl chloride, such as octanoyl chloride or n-octadecanoyl chloride.

The surface of the silicon oxynitride particles may also be surface modified with a surface modifier, e.g., R"Z', wherein Z' is selected from the group consisting of Cl, Br, I, acyl chloride, aldehyde, and epoxy group, R" is a functionalizing group The functionalizing group R" may include alkyl, aryl, cyano, amino, diol, nitro, cation or anion exchange groups, or embedded polar functionalities. Examples of suitable R" functionalizing groups include $C_1$-$C_{30}$ alkyl, including $C_1$-$C_{20}$, such as octyl ($C_8$), octadecyl ($C_{18}$), and triacontyl ($C_{30}$); alkaryl, e.g., $C_1$-$C_4$-phenyl; cyanoalkyl groups, e.g., cyanopropyl; diol groups, e.g., propyldiol; amino groups, e.g., aminopropyl; and alkyl or aryl groups with embedded polar functionalities, e.g., carbamate functionalities. In a preferred embodiment, the surface modifier may be an acetyl chloride, such as octanoyl chloride, n-octadecanoyl chloride, or heptanoyl chloride. Advantageously, R" is octyl or octadecyl. In a preferred embodiment, the surface modifier may be an acyl chloride, such as octanoyl chloride or n-octadecanoyl chloride.

The porous silicon oxynitride particles with high nitrogen content exhibit substantial improvement of chemical stability under high-pH mobile phase conditions. As a consequence of the polar surface $NH_x$ groups and porous structure, the porous silicon oxynitride material demonstrates excellent separation performance for a variety of polar compounds in HILIC mode. The reactivity of surface Si—$NH_2$ and Si—NH—Si groups endows porous silicon oxynitride stationary phase flexible surface tailorability, and opens up abroad applicability in different separation modes through modification using different functionalized reagents. The unmodified and modified porous silicon oxynitride particles have a wide variety of uses in the separation sciences, such as packing materials for chromatographic columns (wherein such columns will have extended lives), thin layer chromatographic plates, filtration membranes, and the like having a stationary phase which includes porous silicon oxynitride particles having a chromatographically-enhancing pore geometry. The stationary phase may be introduced by packing, coating, impregnation, etc., depending on the requirements of the particular device. In a particularly advantageous embodiment, the chromatographic device is a packed chromatographic column, e.g., HPLC.

The present invention may be further illustrated by the following non-limiting examples describing the preparation of porous silicon oxynitride particles, and their use.

EMBODIMENTS

The present invention may be further illustrated by the following non-limiting examples describing the preparation of porous silicon oxynitride material and its use.

Example 1

Spherical amorphous silica (1.5 μm) was placed in a quartz boat and inserted into tubular quartz furnace. Prior to nitridation treatment, the quartz tube was purged by $N_2$ to remove the air. Afterwards, the temperature of the furnace was increased at a ramp rate of 5° C. min$^{-1}$ and maintained at 600° C. for 1 h under the $NH_3$ atmosphere with a flow rate of 10 mLmin$^{-1}$. The furnace was then cooled down to room temperature and purged again with $N_2$ for 1 h. The sample was washed extensively with water and methanol. Elemental analyses were performed several times and an average N content of 0.3 wt. % was determined for the silicon oxynitride material. Nitridation treatment of other silica materials is also carried out using a similar procedure described above. The nitridation temperature, time, flow rate of $NH_3$ and the N content of the obtained porous silicon oxynitride materials from 1a-1k are listed in Table 1.

TABLE 1

| Product | particle size of silica (μm) | Temperature (° C.) | Time (h) | $NH_3$ flow rate (L/min) | N content (wt. %) |
| --- | --- | --- | --- | --- | --- |
| 1a | 1.5 | 600 | 0.1 | 0.01 | 0.3 |
| 1b | 5 | 850 | 20 | 0.2 | 8.0 |
| 1c | 0.5 | 1200 | 100 | 50 | 36.6 |
| 1d | 10 | 600 | 60 | 0.01 | 2.2 |

TABLE 1-continued

| Product | particle size of silica (μm) | Temperature (° C.) | Time (h) | $NH_3$ flow rate (L/min) | N content (wt. %) |
| --- | --- | --- | --- | --- | --- |
| 1e | 100 | 900 | 300 | 50 | 20.4 |
| 1f | 5 | 950 | 36 | 0.2 | 10.0 |
| 1g | 5 | 1050 | 60 | 0.2 | 25.0 |
| 1h | 5 | 1050 | 120 | 0.2 | 28.0 |
| 1i | 20 | 1100 | 100 | 20 | 32.2 |
| 1j | 3 | 1000 | 150 | 2 | 24.0 |
| 1k | 1.7 | 1200 | 300 | 100 | 36 |

Example 2

The specific surface areas, specific pore volumes and the average pore diameters of the obtained porous silicon oxynitride materials are measured using the multi-point $N_2$ sorption method and the data are presented in Table 2.

TABLE 2

| Product | N content (wt. %) | Specific surface area (m$^2$/g) | Pore volume (cc/g) | Average pore diameter (nm) |
| --- | --- | --- | --- | --- |
| 1b | 8.0 | 300 | 0.70 | 9 |
| 1f | 10.0 | 290 | 0.69 | 9 |
| 1g | 25.0 | 229 | 0.60 | 10 |
| 1k | 28.0 | 220 | 0.59 | 10 |

Example 3

The surfaces of silicon oxynitride particles from example 1g are modified with octadecyldimethylchlorosilane as follows, 6.0 mL octadecyldimethylchlorosilane and 1.8 mL pyridine were added to a mixture of 4 g of silicon oxynitride (product 1 g in Table 1) in 100 mL of dry toluene and the resultant mixture was refluxed for 12 h under $N_2$. The modified silicon oxynitride (4a) particles were filtered and washed successively with toluene, methanol, methanol/$H_2O$, and methanol, respectively. The resultant modified spheres were dried at room temperature for 6 h and then in an oven at 80° C. overnight. The carbon content of nonanoyl bonded silicon oxynitride is 9% based on elemental analyses. $^{13}$C CPMAS NMR spectrum of the particles proved the integration of the octadecyl groups attached onto the silicon oxynitride surface (FIG. 1).

Example 4

Surface modification of silicon oxynitride particles with some example surface modifier agents having the formula $Z_a(R')_bSi$—R, where Z=Cl, Br, I, $C_1$-$C_5$ alkoxy, dialkylamino or trifluoromethanesulfonate; a and b are each an integer from 0 to 3 provided that a+b=3; R' is a $C_1$ to $C_6$ straight, cyclic or branched alkyl group, and R is a functionalizing group, were also carried out using a similar procedure described in above example 3. The modifier agent, reaction temperature, reaction time and C content measured using elemental analysis method and the data from 4a-4m are listed in Table 3.

TABLE 3

| Product | Modifier agent | Temperature (° C.) | Time (h) | N content (wt. %) | C content (wt. %) |
|---|---|---|---|---|---|
| 4a | $C_{18}H_{37}(CH_3)_2SiCl$ | 110 | 12 | 24 | 9 |
| 4b | $C_{30}H_{61}Si(OCH_3)_3$ | 130 | 24 | 26 | 16 |
| 4c | $C_6H_5(CH_2)_2SiCl_3$ | 100 | 6 | 27 | 5 |
| 4d | $C_6F_5(CH_2)_2SiCl_3$ | 100 | 3 | 27 | 5 |
| 4e | $CN(CH_2)_3SiCl_3$ | 60 | 12 | 28 | 2 |
| 4f | $CN(CH_2)_3Si(OCH_3)_3$ | 60 | 12 | 28 | 2 |
| 4h | $NH_2(CH_2)_3SiCl_3$ | 60 | 10 | 28 | 2 |
| 4i | $C_{30}H_{61}Si(OCH_3)_3$ | 50 | 6 | 28 | 17 |
| 4h | $(CH_2OH)_2CHSi(CH_3)_2Cl$ | 60 | 36 | 28 | 2 |
| 4i | $SO_3HC_6H_4(CH_2)_3Si(CH_3)_2Cl$ | 100 | 12 | 27 | 5 |
| 4j | $C_3H_7N(CH_3)_2(CH_2)_3SiCl_3$ | 80 | 8 | 27 | 4 |
| 4k | $CH_3(CH_2)_7NHC(O)O(CH_2)_3Si(CH_3)_2Cl$ | 100 | 48 | 27 | 6 |
| 4l | $(CH_3)_3SiCl$ | 100 | 20 | 26 | 1 |
| 4m | $C_{30}H_{61}Si(CH_3)_2Cl$ | 100 | 20 | 26 | 16 |

Example 5

Figure 2:
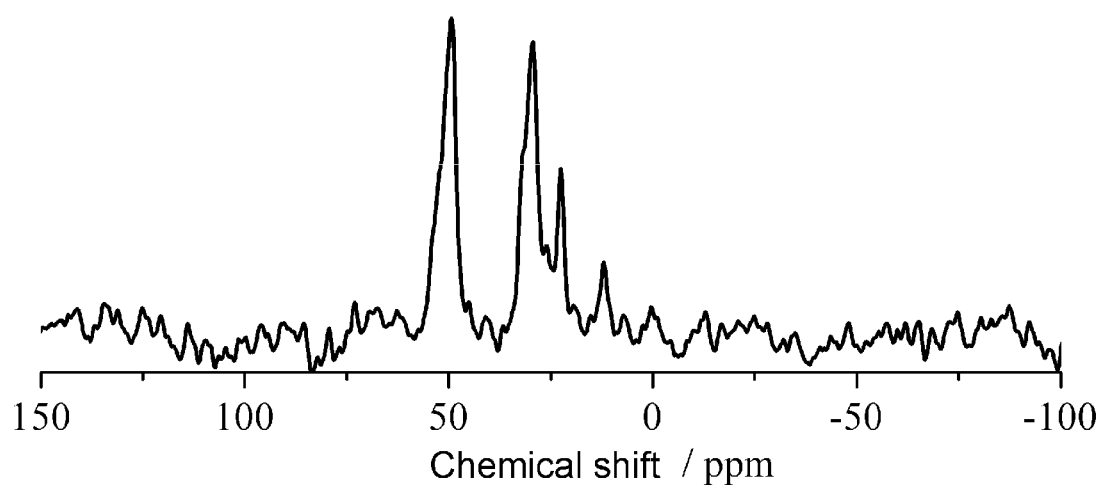
FIG. 2 is a $^{13}C$ CPMAS NMR spectrum of nonanoyl bonded silicon oxynitride material.

The surfaces of the silicon oxynitride particles were modified with nonanoyl chloride as follows, 6.4 mL nonanoyl chloride and 0.4 mL pyridine were added to a mixture of 4 g of silicon oxynitride (product 1g in Table 1) in 100 mL of dry toluene and the resultant mixture was refluxed for 12 h under $N_2$. The modified silicon oxynitride particles were filtered and washed successively with toluene, methanol, methanol/$H_2O$, and methanol, respectively. The resultant modified spheres were dried at room temperature for 6 h and then in an oven at 80° C. overnight. The carbon content of nonanoyl bonded silicon oxynitride is 4.1% based on elemental analyses. Furthermore, $^{13}C$ CPMAS NMR spectrum of the particles showed resonances consistent with elemental analyses result (FIG. 2).

Example 6

Surface modification of silicon oxynitride particles with some example surface modifier agents having the formula R"Z', wherein Z' is selected from the group consisting of Cl, Br, I, acyl chloride, aldehyde, and epoxy group, and R is a functionalizing group, were also carried out using a similar procedure described in above example 5. The modifier agent, reaction temperature, reaction time and C content measured using elemental analysis method and the data from 6a-6g are listed in Table 4.

TABLE 4

| Product | Modifier agent | Temperature (° C.) | Time (h) | C content (wt. %) |
|---|---|---|---|---|
| 6a | 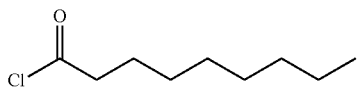 | 110 | 12 | 4.1 |
| 6b |  | 25 | 3 | 2 |
| 6c | 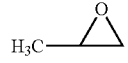 | 30 | 6 | 2.5 |
| 6d | 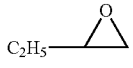 | 40 | 8 | 3 |
| 6e | 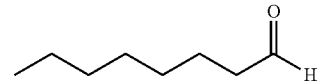 | 60 | 12 | 5 |
| 6f | 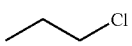 | 40 | 10 | 3 |
| 6g | 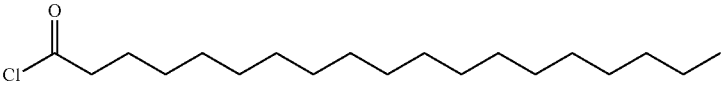 [SMILES: CCCCCCCCCCCCCCCCCCC(=O)Cl] | 100 | 48 | 10 |

Example 7

Selected example of silicon oxynitride particles from Example 1g as well as similarly commercial columns based on silica gel were evaluated for stability in alkaline mobile phases using the following procedure. Columns were prepared by slurry packing the material into 4.6×50 mm steel column, and the analysis conditions were as follows: The silicon oxynitride column was subjected to an aggressive aging testusing mobile phase of 20 mM $NH_4Ac$ adjusted by 10% $NH_3.H_2O$ at pH 9.0 at 30° C. After each 60 min time period, the column was washed with $H_2O$ for 10 min, equilibrated with 90:10 $ACN/H_2O$ for 6 min, and 1 μL of solution composed of toluene and cytosine was automatically injected and separated using the same mobile phase. To detect any change, the chromatographic plate number and column pressure were monitored as functions of the volume of the pH 9.0 mobile phase that had passed through the columns. For comparison, commercial silica with a particle size of 5 μm was packed into similar 4.6×50 mm steel column and submitted to the same aging test. All the compositions of mobile phase used in chromatographic evaluation were the ratio of V:V. A drastic loss in theoretical plates accompanying with steep increase of column pressure can be observed for silica column after exposure to the pH 9.0 mobile phase for 4 h. The silicon oxynitride column shows much higher chemical stability than the silica column, and 94% of the original column efficiency can be still preserved after 50 h of exposure to pH 9.0 mobile phase.

Example 8

Figure 3:
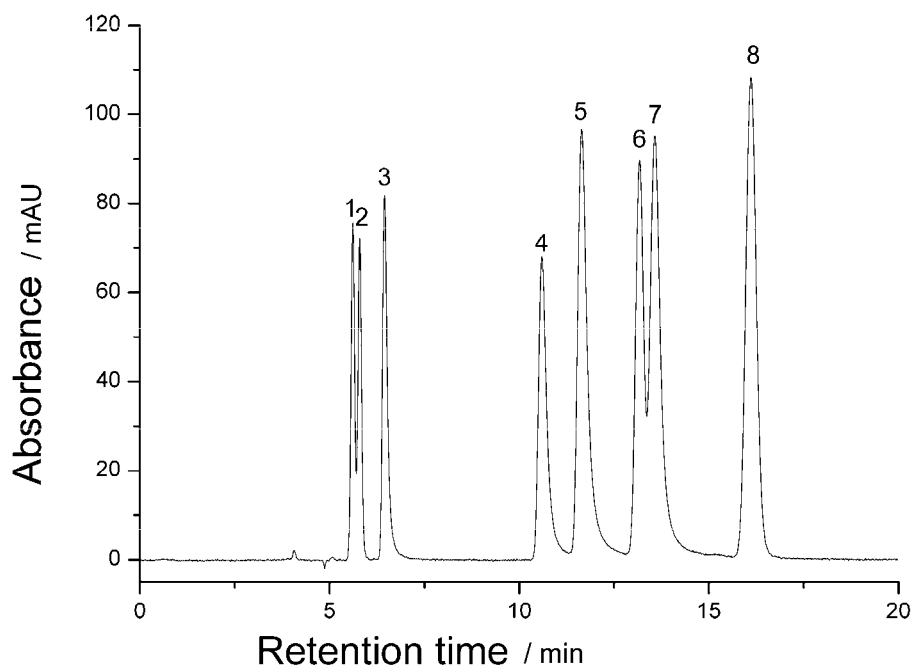
FIG. 3 shows the separation of nucleic acid base and nucleosides on silicon oxynitride column (250 mm×4.6 mm i.d.) with ACN/$H_2O$ (90/10, V/V). Column temperature: 25° C., flow rate: 1.0 mL $min^{-1}$, UV detection 254 nm. Analytes, 1 thymine, 2 uracil, 3 urine, 4 adenosine, 5 guanosine, 6 adenine, 7 cytidine, 8 cytosine.
Figure 4:
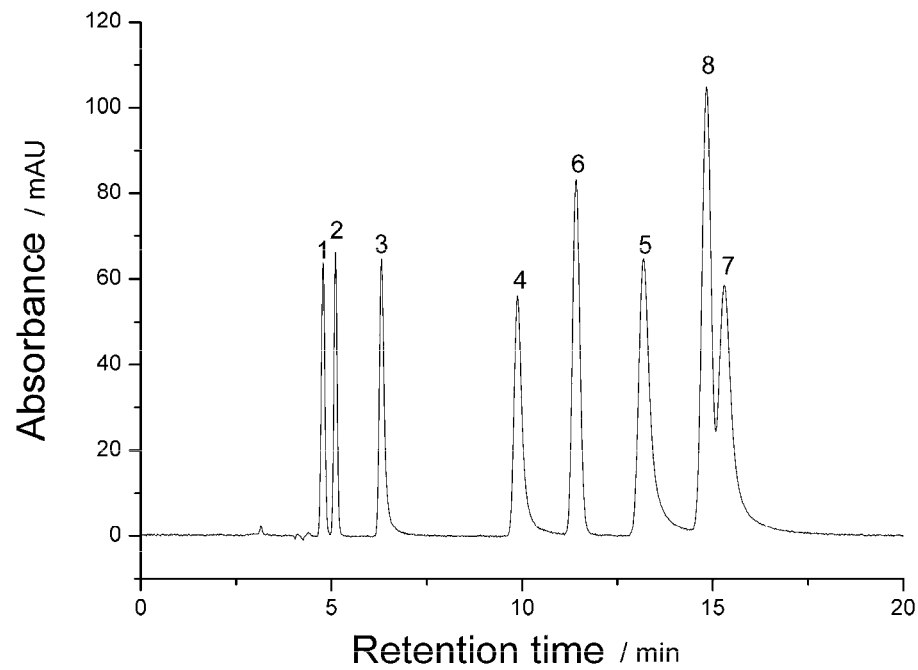
FIG. 4 shows the separation of nucleic acid base and nucleosides on silicon oxynitride column (250 mm×4.6 mm i.d.) with 90:10 ACN/100 mM $NH_4$Ac (pH 9.0 adjusted by 10% $NH_3.H_2O$). Column temperature: 25° C., flow rate: 1.0 mL $min^{-1}$, UV detection 254 nm. Analytes, 1 thymine, 2 uracil, 3 urine, 4 adenosine, 5 guanosine, 6 adenine, 7 cytidine, 8 cytosine.
Figure 5:
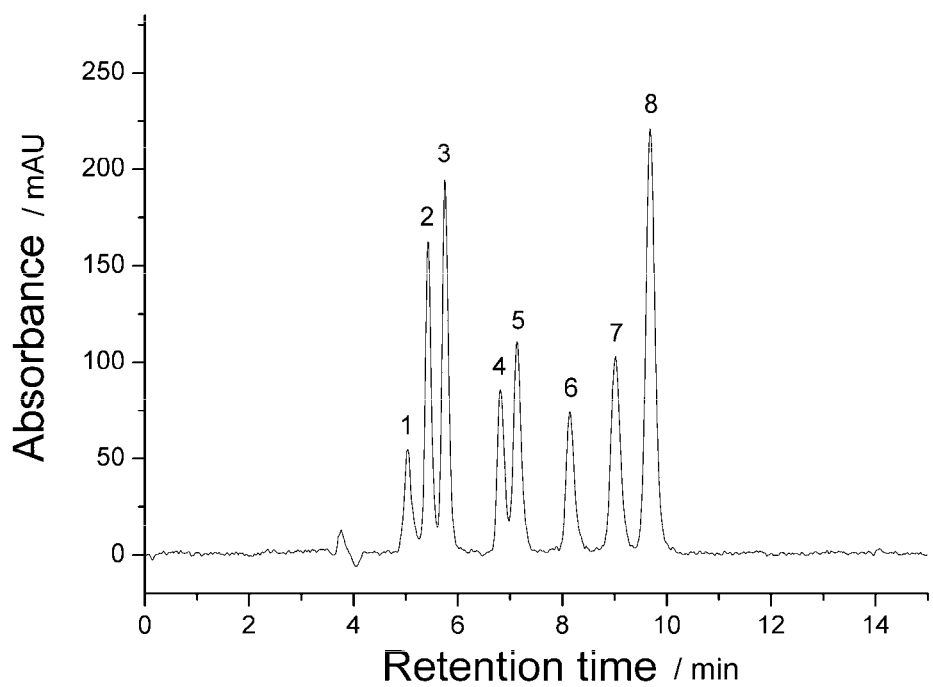
FIG. 5 shows the separation of oligosaccharides on silicon oxynitride column (250 mm×4.6 mm i.d.) with ACN/$H_2O$ (80/20, V/V). Column temperature: 40° C., flow rate: 1.0 mL $min^{-1}$, ELS detector: gas pressure 30 psi, tube temperature 85° C., and gain 10. Analytes, 1 xylose, 2 sorbose, 3 glucose, 4 sucrose, 5 turanose, 6 maltitol, 7 maltotriose, 8 raffinose.
Figure 6:
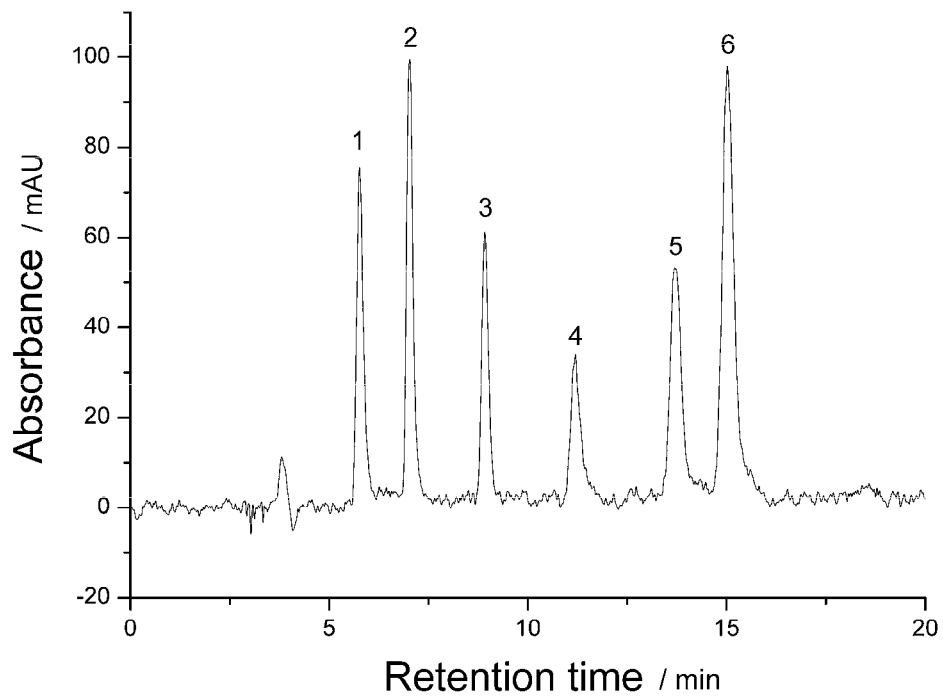
FIG. 6 shows the separation of nucleic acid base and nucleosides on silicon oxynitride column (250 mm×4.6 mm i.d.) with 80:20 ACN/100 mM $NH_4$Ac (pH 9.0 adjusted by 10% $NH_3.H_2O$). Column temperature: 25° C., flow rate: 1.0 mL $min^{-1}$, UV detection 254 nm. Analytes, 1 thymine, 2 uracil, 3 urine, 4 adenosine, 5 guanosine, 6 adenine, 7 cytidine, 8 cytosine.

Selected example of silicon oxynitride particles from Example 1b were packed in 250 mm×4.6 mm i.d. steel columns, and the performances of chromagraphic separation were evaluated using the mixture of polar compounds including nucleic acid base, nucleosides, and saccharides as probes. As shown in FIGS. 3-4, mixtures of nucleic acid base and nucleosides were well separated on the silicon oxynitride column with $ACN/H_2O$ (90/10, V/V), and ACN/100 mM $NH_4Ac$ (90/10, V/V), separately. As shown in FIGS. 5-6, saccharides were well separated on the silicon oxynitride column with $ACN/H_2O$ (80/20, V/V), and ACN/100 mM $NH_4Ac$ (80/20, V/V), separately.

Example 9

Figure 7:
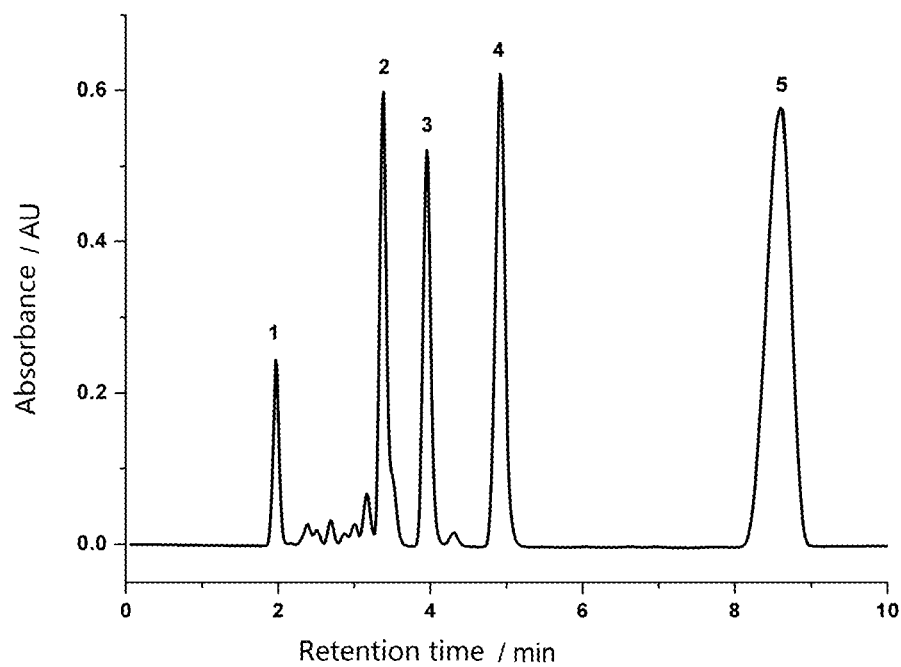
FIG. 7 shows the separation of alkybenzenes on octadecyl bonded silicon oxynitride column (150 mm×4.6 mm i.d.) with methanol/$H_2O$ (80/20, V/V). Column temperature: 30° C., flow rate: 1.0 mL $min^{-1}$, UV detection 254 nm. Analytes, 1 uracil, 2 toluene, 3 ethylbenzene, 4 propylbenzene, 5 pentylbenzene.

Selected example of silicon oxynitride particles from Example 4a were packed in 150 mm×4.6 mm i.d. steel columns, and the performances of chromagraphic separation were evaluated using the mixture of alkylbenzenes as hydrophobic probes. As shown in FIG. 7, octadecyl bonded silicon oxynitride column exhibits excellent chromatographic properties for separation of alkylbenzene with $CH_3OH/H_2O$ (80/20, V/V), and toluene, ethylbenzene, and propylbenzene were eluted sequentially.

Example 10

Figure 8:
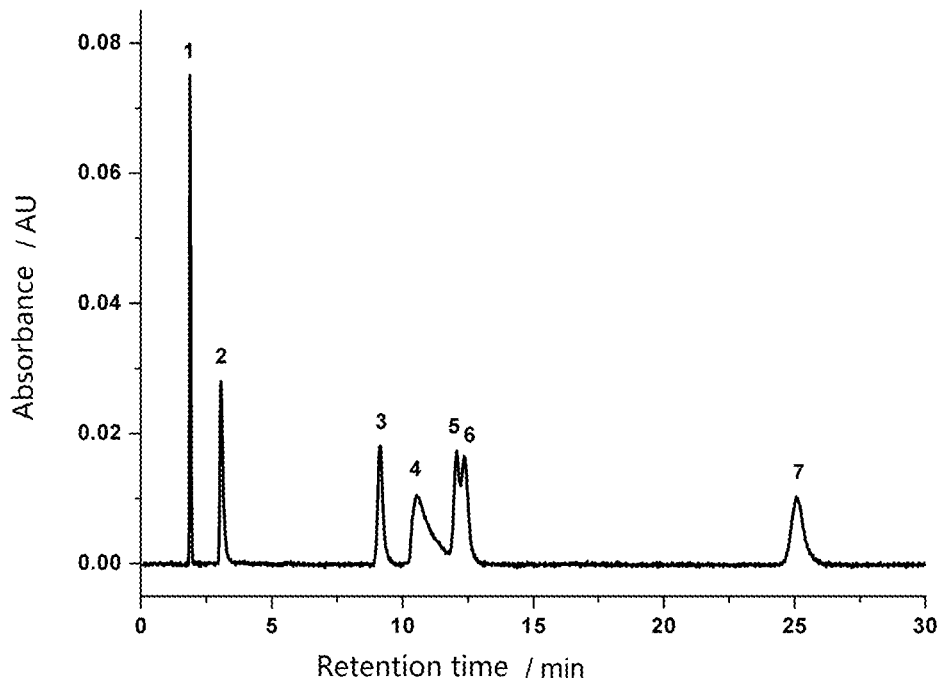
FIG. 8 shows the separation of analytes on octadecyl bonded silicon oxynitride column (150 mm×4.6 mm i.d.) with 60:40 methanol/100 mM $NH_4$Ac (pH 5.0). Column temperature: 30° C., flow rate: 1.0 mL $min^{-1}$, UV detection 260 nm. Analytes, 1 uracil, 2 propranolol, 3 butylparaben, 4 amitriptyline, 5 naphthalene, 6 dipropylphthalate, 7 acenaphthene.

Selected example of silicon oxynitride particles from Example 4a were packed in 150 mm×4.6 mm i.d. steel columns, and the performances of chromatographic separation were evaluated using hydrophobic probes. As shown in FIG. 8, octadecyl bonded silicon oxynitride column exhibits excellent chromatographic properties, and 60000 plates $m^{-1}$ can be obtained for acenaphthene.

Example 11

Figure 9:
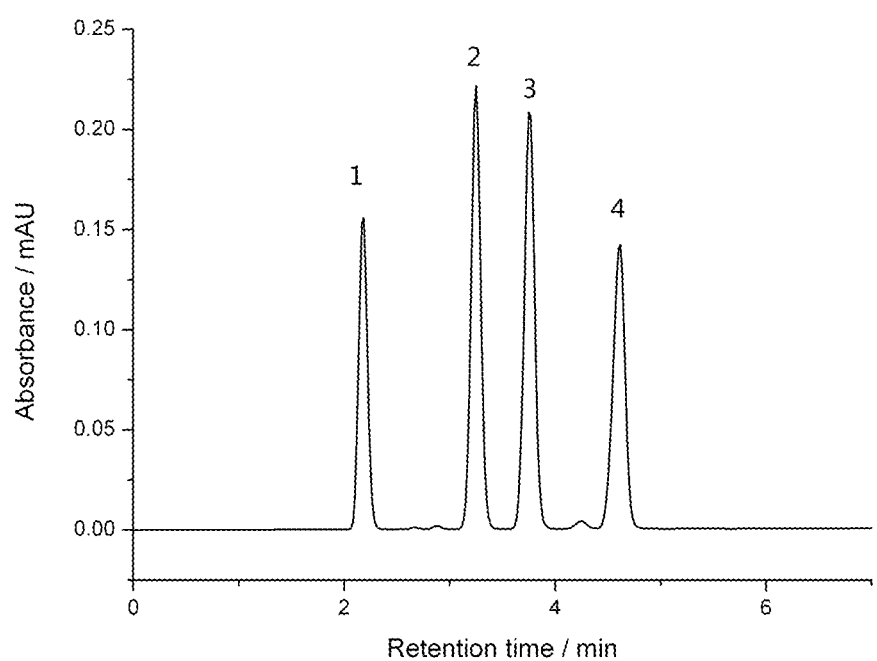
FIG. 9 shows the separation of alkylbenzenes on nonanoyl bonded silicon oxynitride column (150 mm×4.6 mm i.d.) with methanol/$H_2O$ (50/50, V/V). Column temperature: 30° C., flow rate: 1.0 mL min$^{-1}$, UV detection 254 nm. Analytes, 1 uracil, 2 toluene, 3 ethylbenzene, 4 propylbenzene.

Selected example of silicon oxynitride particles from Example 6a were packed in 150 mm×4.6 mm i.d. steel columns, and the performances of chromagraphic separation were evaluated using the mixture of alkylbenzenes as hydrophobic probes. As shown in FIG. 9, nonanoyl bonded silicon oxynitride column exhibits excellent chromatographic properties for separation of alkylbenzene with $CH_3OH/H_2O$ (50/50, V/V), and toluene, ethylbenzene, and propylbenzene were eluted sequentially.

What is claimed is:

1. A chromatographic stationary phase, comprising porous silicon oxynitride particles represented by formula $SiO_xN_y$, wherein $0 \leq x < 2$, $0 < y \leq 4/3$, and $2x+3y=4$,
    wherein a surface of said particles comprises a surface modifier having a formula R"Z', Z' is selected from the group consisting of Cl, Br, I, acyl chloride, aldehyde, and an epoxy, and R" is selected from the group consisting of alkyl, alkenyl, alkynyl, aryl, and an alkyl or aryl group containing an embedded polar functionality,
    wherein alkyl, alkenyl, alkynyl, aryl are each independently unsubstituted or having one or more substituents selected from the group consisting of halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino, alkyl amino, dialkylamino, arylamino, diarylamino, alkylarylamino, acylamino, alkylcarbonylamino, arylcarbonylamino, carbamoyl, ureido, amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, diol, ester, an aromatic moiety, and a heteroaromatic moiety.

2. The chromatographic stationary phase of claim 1, wherein R" is a $C_1$-$C_{30}$ alkyl.

3. The chromatographic stationary phase of claim 1, wherein R" is a $C_8$.

4. The chromatographic stationary phase of claim 1, wherein R" is a $C_{18}$.

5. The chromatographic stationary phase of claim 1, wherein R" is a $C_6A_5$-$(CH_2)_c$—, wherein A=H, F, or Cl, and c is an integer from 1 to 4.

6. The chromatographic stationary phase of claim 1, wherein said surface modifier is selected from the group consisting of octanoyl chloride, n-octadecanoyl chloride, and heptanoyl chloride.

7. The chromatographic stationary phase of claim 1, wherein said particles have a mean particle size of about 0.5 to 200 μm, a specific surface area of about 30 to 800 $m^2/g$, a specific pore volume of about 0.15 to 1.5 $cm^3/g$, an average pore diameter of about 30 to 500 Å.

8. A method of preparing the chromatographic stationary phase of claim 1, comprising the steps of:
    forming silicon oxynitride particles, and
    modifying the porous particles with a surface modifier,
        wherein said particles having a composition represented by formula $SiO_xN_y$, wherein $0 \leq x < 2$, $0 < y \leq 4/3$, and $2x+3y=4$;
        wherein said surface modifier has formula R"Z', wherein Z' is selected from the group consisting of Cl, Br, I, acyl chloride, aldehyde, and epoxy group, and R" is selected from the group consisting of alkyl, alkenyl, alkynyl, aryl, and an alkyl or aryl group containing an embedded polar functionality, wherein alkyl, alkenyl, alkynyl, aryl are each independently unsubstituted or having one or more substituents selected from the group consisting of halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino, alkyl amino, dialkylamino, arylamino, diarylamino, alkylarylamino, acylamino, alkylcarbonylamino, arylcarbonylamino, carbamoyl, ureido, amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, a diol, an ester, an aromatic moiety, and a heteroaromatic moiety.

9. The method of claim 8, wherein the step of forming silicon oxynitride particles comprises heating porous silica particles exposed to an ammonia flow at 600-1250° C. for 0.1-300 hrs, wherein the silicon oxynitride particles have a nitrogen content of 0.1-40%.

10. The method claim 8, wherein the step of forming silicon oxynitride particles further comprises drying in vacuum the silicon oxynitride articles at 80-150° C. for 6-48 hrs, and mixing the dried silicon oxynitride particles in a solvent with the surface modifier to form a mixture, reacting mixture at 20-130° C. for 6-48 hrs, filtering the mixture to obtain the silicon oxynitride particles, washing the silicon oxynitride particles successively with toluene, methanol, methanol/$H_2O$, and methanol.

11. The method of claim 10, wherein the solvent is dichloromethane, methanol, ethanol, toluene, xylene, ethyl acetate, or furanidine; wherein the content of pyridine or triethylamine in the solvent is 0-100%; wherein an amount of surface modifier having the formula R"Z' added in 1 g of silicon oxynitride is 1-5 mmol; wherein an amount of the solvent added in 1 g of silicon oxynitride is 30-60 mL.

12. A chromatographic column, comprising:
a column having a cylindrical interior; and a stationary phase of claim 1 resides inside the cylindrical interior of the column.

13. A method of separation, comprising the steps of: preparing a chromatographic column having a stationary phase of claim 1; and running a sample through the column.

14. The chromatographic stationary phase of claim 1, wherein aryl is selected from a group consisting of unsubstituted 5-membered single-ring aromatic moieties, unsubstituted 6-membered single-ring aromatic moieties, unsubstituted polycyclic fused aromatic moieties, unsubstituted phenyl moieties, an aryloxy, and an aralkyoxy.

* * * * *